United States Patent
Kia et al.

(10) Patent No.: US 6,404,870 B1
(45) Date of Patent: Jun. 11, 2002

(54) METHOD AND APPARATUS FOR AUTHORIZATION BASED PHONE CALLS IN PACKET SWITCHED NETWORKS

(75) Inventors: Azita E. Kia, Santa Barbara; Cary FitzGerald, Pleasanton, both of CA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/333,779

(22) Filed: Jun. 15, 1999

Related U.S. Application Data
(60) Provisional application No. 60/100,208, filed on Sep. 14, 1998.

(51) Int. Cl.[7] .............................................. H04M 17/00

(52) U.S. Cl. .............................. 379/144.01; 379/114.01; 379/114.15; 379/114.16; 379/114.17; 379/114.2

(58) Field of Search ................................ 379/111, 112, 379/114, 126, 133, 144, 243, 112.01, 114.01, 114.15, 114.16, 114.17, 114.19, 114.2; 370/252, 356

(56) References Cited

U.S. PATENT DOCUMENTS

| | | | | |
|---|---|---|---|---|
| 5,701,301 A | * | 12/1997 | Weisser, Jr. ................. | 370/428 |
| 5,793,771 A | * | 8/1998 | Darland et al. ............. | 370/467 |
| 5,825,857 A | * | 10/1998 | Reto et al. ................... | 379/114 |
| 5,956,391 A | * | 9/1999 | Melen et al. ................ | 379/114 |
| 6,064,653 A | * | 5/2000 | Farris .......................... | 370/352 |
| 6,078,582 A | * | 6/2000 | Curry et al. ................. | 370/356 |
| 6,097,804 A | * | 8/2000 | Gilbert et al. ............... | 370/252 |
| 6,104,704 A | * | 8/2000 | Buhler et al. ................ | 370/252 |
| 6,122,364 A | * | 9/2000 | Petrunka et al. ............. | 379/265 |
| 6,125,177 A | * | 9/2000 | Whittaker .................... | 379/243 |
| 6,137,869 A | * | 10/2000 | Voit et al. .................... | 379/114 |

* cited by examiner

*Primary Examiner*—Curtis Kuntz
*Assistant Examiner*—Quoc Tran
(74) *Attorney, Agent, or Firm*—Marger Johnson & McCollom, P.C.

(57) ABSTRACT

A call authorization system moves state maintenance for authorization based phone calls from a central authorization server to different gateways in a packet switched network. A simple authorization session protocol is used between the authorization server and the gateways to minimize network traffic. The authorization session protocol releases the authorization server from having to maintain states for open authorization based phone calls.

25 Claims, 6 Drawing Sheets ized authorization server. If the authorization server
crashes, all open authorization based calls could be discon-
METHOD AND APPARATUS FOR AUTHORIZATION BASED PHONE CALLS IN PACKET SWITCHED NETWORKS This Application claims benefit of Provisional Ser. No. 60/100,208 filed Sep. 14, 1998.

FIELD OF THE INVENTION

This present invention relates generally to systems for supporting authorization based phone calls, and more particularly to a distributed authorization based phone call system used in Voice Over IP networks.

BACKGROUND OF THE INVENTION

Packet switched networks route voice traffic using a Voice Over Internet Protocol (VoIP). VoIP allows telephone calls to be carried over an Internet Protocol (IP) network between two telephones or computers.

Authorization systems verify user authorization to particular phone services before allowing the phone network to connect the call. The authorization system usually exchanges certain parameters between a Network Access Server (NAS) that receives inputs from a user and an authorization server that has access to a user database containing authorization information for valid users.

Credit based authorization is one type of authorization based phone call. With credit based authorization, the user sets up a debit account with a telephone company prior to making phone calls. The debit account often takes the form of a preapproved calling card. When the user wishes to make a phone call, the authorization system verifies that the user has sufficient credit on the calling card account before connecting the phone call. As the call continues, the authorization system continuously tracks the cost of additional time of the call and subtracts the additional cost from the remaining credit in the calling card account. The authorization system notifies the user when the credit limit is about to run out on the calling card. If the user continues to talk past the remaining credit limit, the authorization system terminates the phone call.

In VoIP networks, a call is established through the packet switched network via a local gateway. A central authorization server in another part of the network tracks state information regarding the authorization based call. State information includes account identification information associated with the call, the rate for the current call, the elapsed time of the current call, the amount of credit remaining on the prepaid calling card, etc.

The authorization server keeps state information for all open authorization based calls that go through the same authorization system. This centralized authorization system does not scale well. This is because all open authorization based calls are managed by the same authorization server. There is also a reliability (robustness) problem with a centralized authorization server. If the authorization server crashes, all open authorization based calls could be disconnected. State information for all the open authorization based calls can also be lost when the authorization server crashes, creating accounting errors.

Another problem exists with tracking authorization based call states from a central authorization server. The gateways that establish the call connections between two different endpoints are typically not prepared to respond to signals sent asynchronously from the authorization server. Thus, if the authorization server identifies a call exceeding a user's credit authorization, the gateway may not be able to disconnect the call in a timely manner.

Thus, the need remains for improving the scalability and reliability of authorization based telephone systems.

SUMMARY OF THE INVENTION

A call authorization system moves authorization based state maintenance from a central authorization server to multiple gateways in a packet switched network. A simple authorization session protocol is used between the authorization server and the gateways that minimizes network traffic and also releases the authorization server from maintaining call states for open authorization based phone calls.

The gateway receives an account identifier and an authorization request for establishing a phone call with an endpoint in the packet-switched network. The gateway sends an authorization request message to the authorization server including the account identifier and the authorization request. The authorization server uses the account identifier as an index for matching a user record in a user database.

The authorization server sends back a response message accepting the authorization request if a user record verifies the authorization request. The gateway connects the call when the authorization request is accepted and then maintains call authorization states for the connected call. If the authorization request is rejected by the authorization server, the gateway terminates the authorization request.

Scaling of the authorization system is improved since the authorization server is freed from maintaining call states for all open authorization based calls. Robustness is also improved because the authorization server can crash and come back up during a credit based call without disconnecting or losing call state information for open calls. Because call state maintenance is distributed to multiple gateways, any one gateway can crash, and not affect credit based calls established through other gateways.

The authorization session between the authorization server and the gateway is used for a variety of different types of authorization based phone calls. For example, the invention is used for credit based call authorization such as required for prepaid calling cards. The invention allows the gateway to effectively "escrow" funds from the user account while the call is in progress, with a timer ticking down the escrow amount. The authorization server takes the entire escrowed amount out of the user's debit account. If the call terminates before the escrowed amount held at the gateway is used up, the remaining escrowed amount is "re-credited" to the user's account maintained by the authorization server. Thus, instead of maintaining and conducting all authorization state processing in the authorization server, the escrowed amount is held and maintained by the gateway and returned to the authorization server at the end of the call.

The invention is also used for destination based call authorization where a particular call account is authorized to make calls only to prespecified phone numbers. In another application, the authorization session is used for class of service based call or quality of service authorization where call accounts are authorized for particular call services, such as video conference calls.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
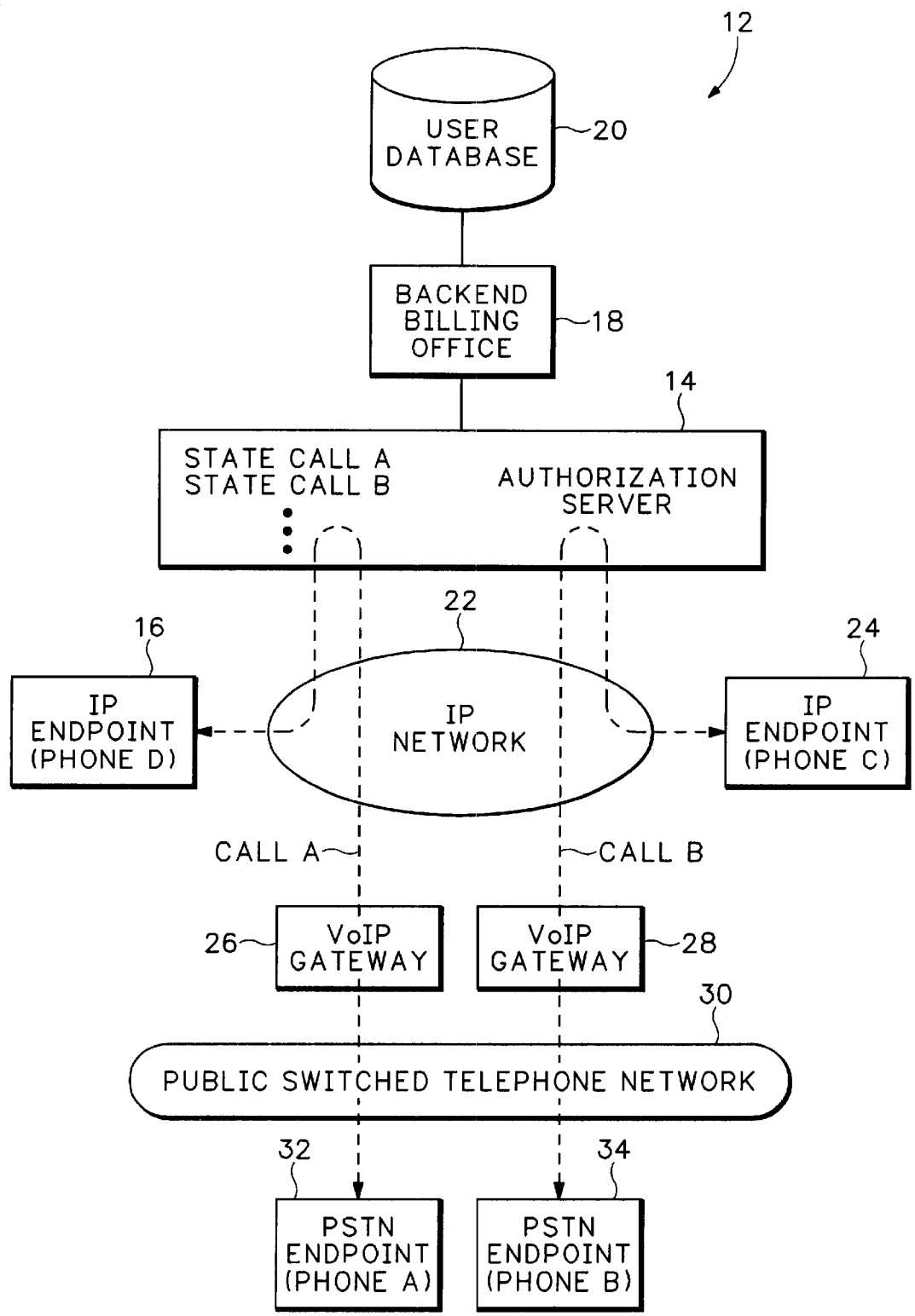
FIG. 1 is a functional block diagram illustrating a prior art VoIP system.

FIG. 1 is a functional block diagram of a VoIP network 12. The network 12 includes an Internet Protocol (IP) network 22 connected to gateways 26 and 28, an authorization server 14 and IP endpoints 16 and 24. Gateways 26 and 28 provide VoIP access between IP network 22 and a Public Switched Telephone Network (PSTN) 30. Authorization server 14 is connected to a backend billing system 18 that accesses a user database 20.

PSTN 30 is connected to several PSTN endpoints, such as endpoints 32 and 34 which are standard circuit switched telephones. Phones 32 and 34 access one another through PSTN 30 and to endpoints 16 and 24 through gateways 26 and 28 and IP network 22. IP endpoints 16 and 24 are IP phones with VoIP service.

VoIP services are accessed from the phones 32 and 34 via PSTN 30 or directly through the IP network 22 by IP phones 16 and 24. In the first case a phone connection involves dialing into an incoming gateway. In both the PSTN and IP Phone cases a connection involves a terminating gateway that eventually connects to a destination telephone.

FIG. 1 shows how a credit based phone call was authorized in earlier VoIP systems. Credit based calls, such as call A and call B, would first have to be switched through the authorization server 14. The authorization server 14 would then maintain call states for both call A and call B during the duration of the call. Maintaining these call states comprised, among other things, identifying a specific account for the call, the destination for the call, the rate for the call and the duration of the call.

As mentioned above, this centralized authorization system does not scale well because the authorization server 14 must manage states for all open authorization based calls in the packet switched network 22. There is also a reliability (robustness) problem. If the authorization server 14 crashes, state information for all open authorization based calls (call A and call B) is lost and the call charges are not debited correctly to the appropriate call account.

Figure 2:
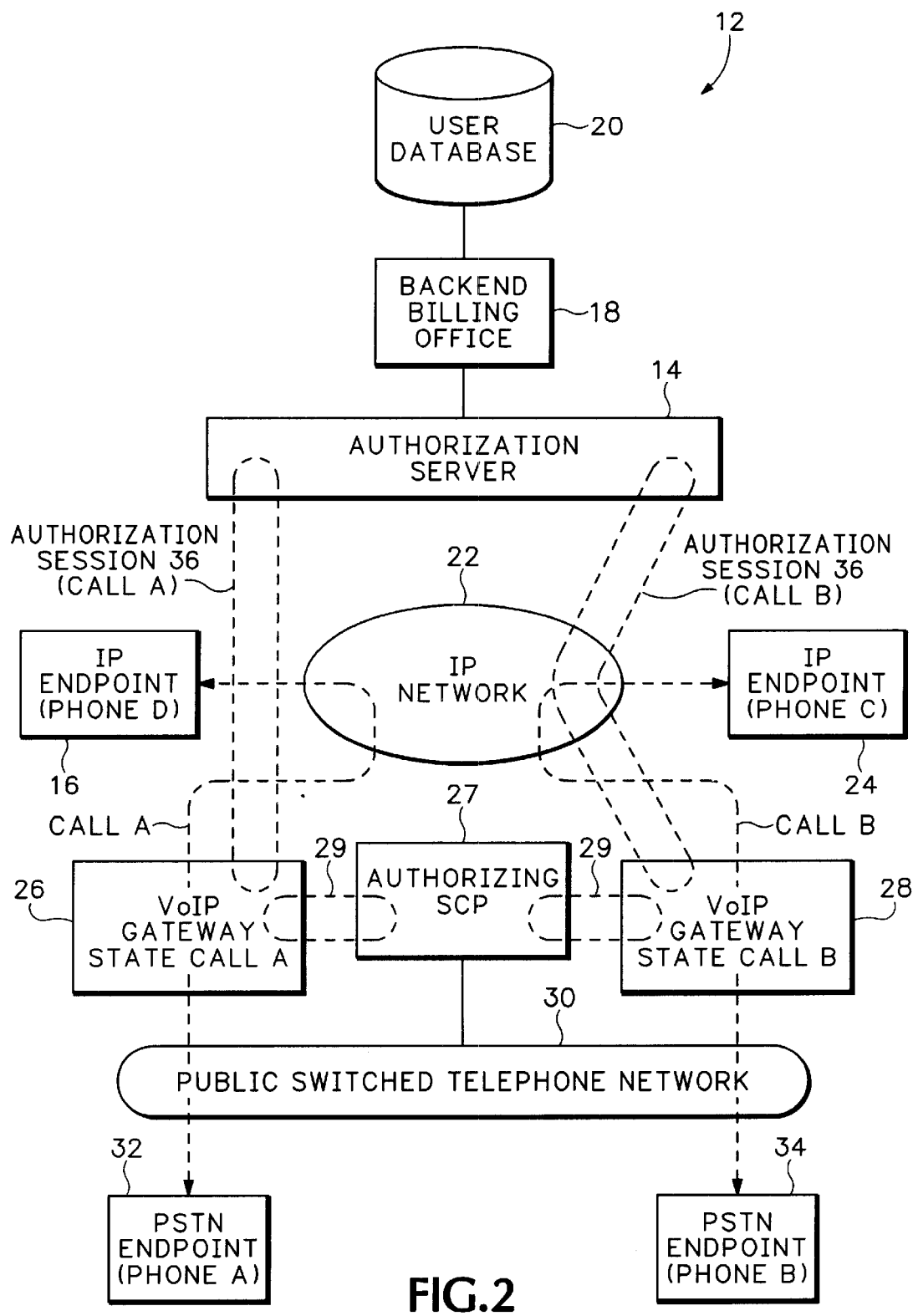
FIG. 2 is a functional block diagram of the VoIP system shown in FIG. 1 including an authorization system according to the present invention.

Referring to FIG. 2, the present invention moves call state management for the authorization based calls from the central authorization server 14 to the local gateways 26 and 28. The gateways 26 and 28 communicate with the authorization server 14 through authorization sessions 36. There are several protocols that can be used for conducting the authorization session 36, such as RADIUS or DIAMETER.

Service Control Points (SCPs) 27 from the circuit switched telephone network 30 can also conduct authorization sessions 29 for call authorization.

The accounting system residing in backend billing office 18 supports call accounting and permits two way communication with gateways 26 and 28 to allow queries for user authorization information, such as credit, destination and class of service. The accounting system also allows accounting messages to be reported in the middle of calls in addition to connect and disconnect times. This is useful in measuring long duration calls where is it desirable to update the credit value for the user in database 20 at intervals during the call. The accounting system supports multiple existing accounting message formats such as Automatic Message Accounting (AMA).

When a user at one of the phones 16, 24, 32 or 34 attempts to make a authorization based VoIP call, such as a credit based call, the telephone connects to one of the VoIP gateways in the network 12. For purposes of example, assume that telephone 32 accesses gateway 26 in order to make a VoIP call to phone 16.

Instead of routing the call through the authorization server 14 for authorization and call state management, the gateway 26 collects account information such as account identification (ACCT ID) and a password/personal identification number (PIN). The account information is obtained from a user by the gateway 26 through an interface such as an Integrated Voice Response (IVR) application. The IVR application generates the voice prompts and retrieves the Dual Tone Multiple Frequency (DTMF) signals used by the gateway 26 to collect the account and call request information. IVR applications are known to those skilled in the art and are therefore not described in further detail.

The user ACCT ID and PIN information collected by the IVR application in the gateway 26 is sent to authorization server 14 during the authorization session 36. The authorization server 14 checks the user ACCT ID and PIN against information in the user database 20 in order to authenticate the user call request. Success or failure of the authorization check is reported back in a response message from the authorization server 14 to the gateway 26.

It is important to emphasize that the authorization server 14 does not maintain call states. In other words, the authorization server 14 no longer is required to continually track information, such as account information call duration and call destination for open calls in the IP network 22. The authorization server 14 only has to verify. authorization requests and then send back response messages either accepting or rejecting the authorization request. The gateway 26 then controls when any further processing is required for that call by sending another request.

Figure 3:
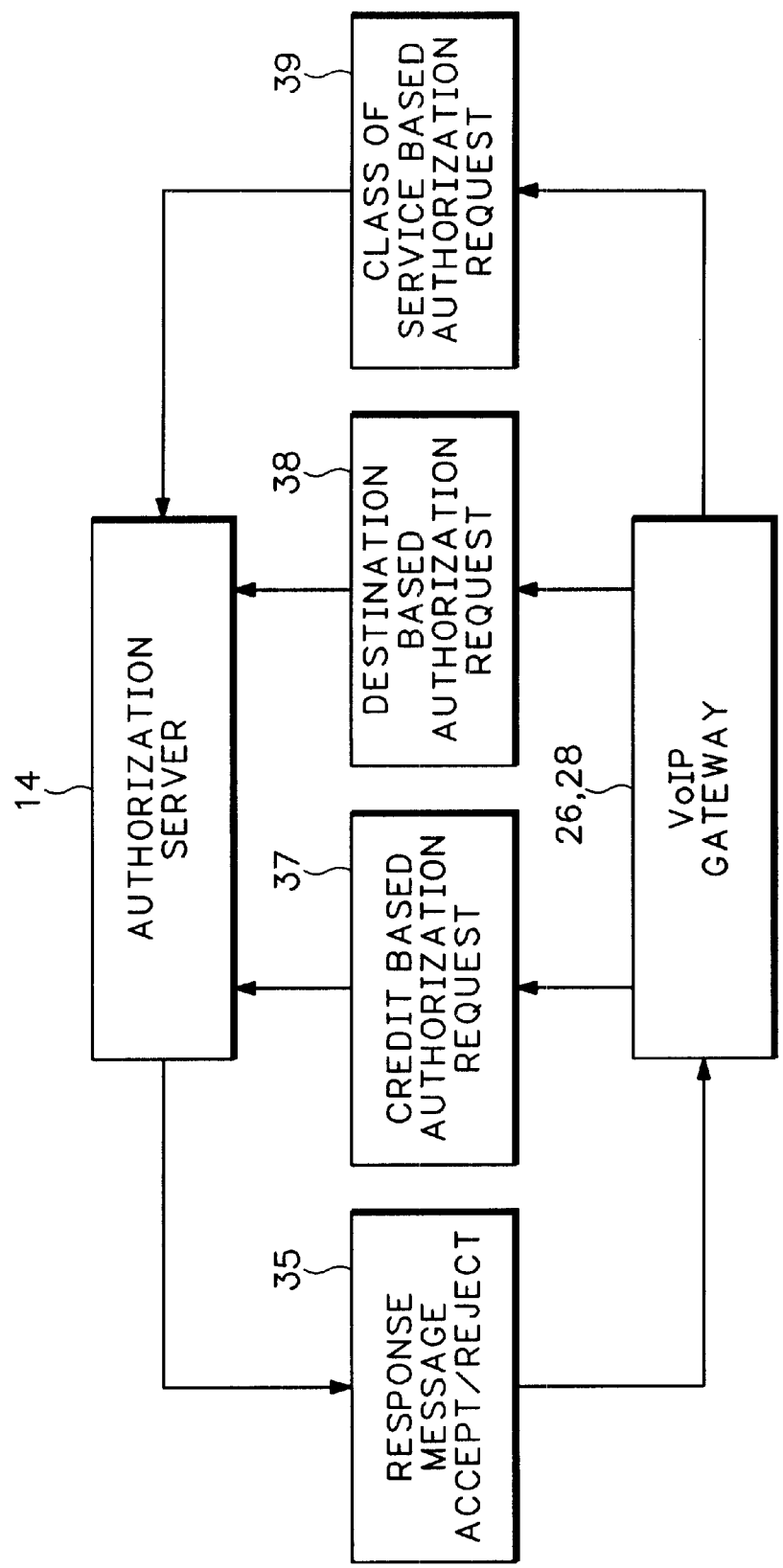
FIG. 3 is a block diagram showing different types of authorization based phone calls supported by the authorization system shown in FIG. 2.

FIG. 3 shows different types of authorization based calls that are supported by the authorization system. A credit based authorization request 37 is used for credit based calls such as those made with prepaid calling cards. A destination based authorization request 38 is used when authorization is based on a particular source or destination of the call such as when a particular call account is only authorized to make calls to prespecified phone numbers. A class of service based authorization request 39 is used to authorize particular call services, such as video conference calls. The authorization server 14 sends back a response message 35 that either accepts or rejects the authorization request 37, 38, or 39. Credit based authorization, destination based authorization and class of service based authorization are discussed in further detail below.

Figure 4:
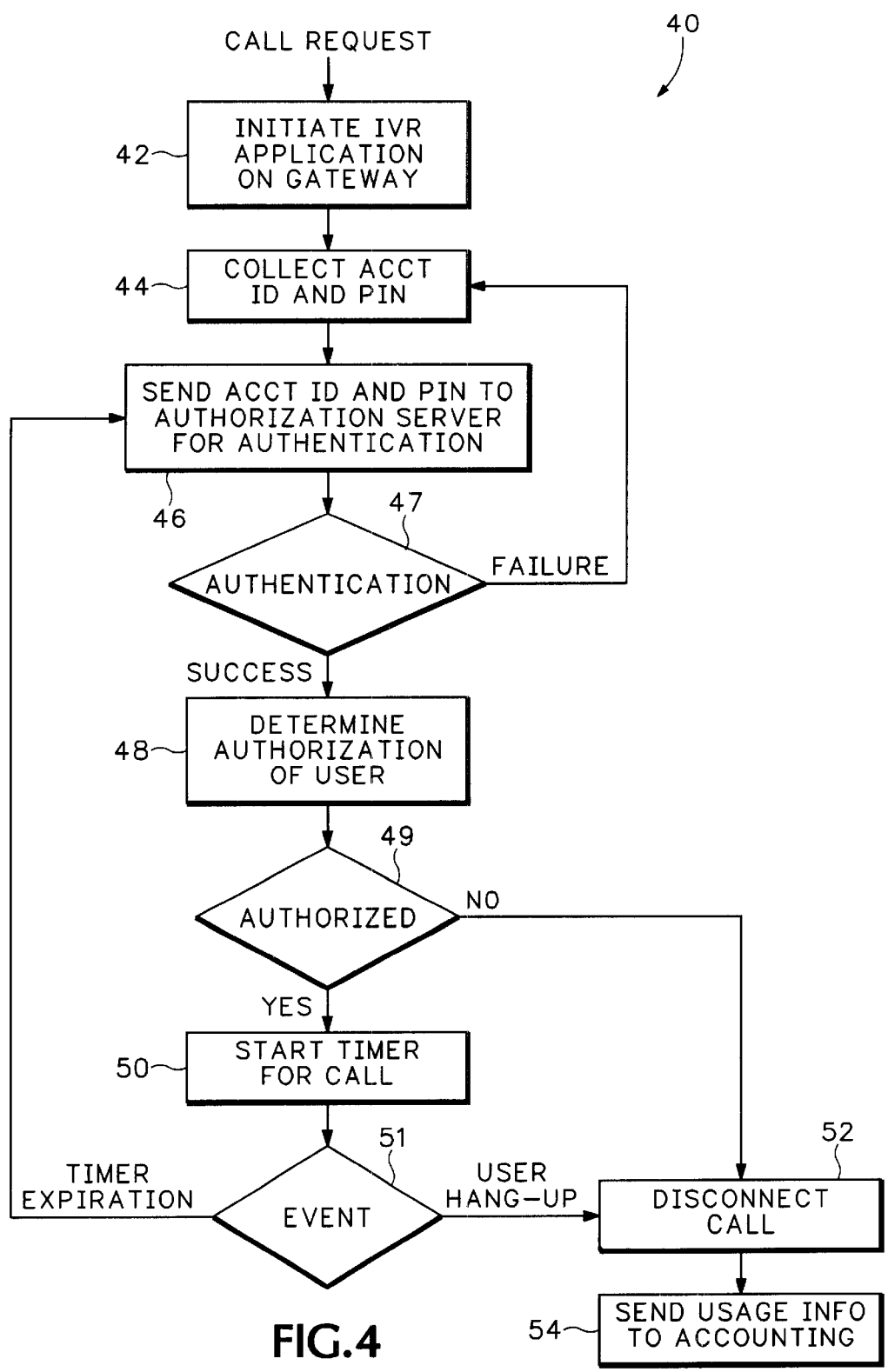
FIG. 4 is a flow diagram showing how a gateway in FIG. 2 conducts an authorization session according to the present invention.

FIG. 4 shows a flow diagram of a process 40 that executes within gateway 26 or 28 during the authorization session 36. For simplicity, the process 40 is described below with respect to gateway 26. However, the process is applicable to any gateway in the VoIP network 12 that receives an authorization request from a user.

When a call request is received, the gateway 26 in step 42, initiates the IVR application to interface with the user. The IVR application in gateway 26 collects the user's ACCT ID and PIN information in step 44 by prompting the user and then monitoring the user responses. Gateway 26 sends the ACCT ID and PIN to authorization server 14 in step 46 for authentication.

In step 47, gateway 26 waits for the response from authorization server 14. The authorization server 14 uses the ACCT ID and PIN to authenticate the call in the user database 20 through backend billing office 18 (FIG. 2). If authentication fails in step 47 due to a bad PIN, bad ACCT ID, or a protocol error, control flow returns to step 44. The IVR application then prompts and collects the user information again. If the authorization server 14 is successful in authenticating the authorization information in user database 20, control flow proceeds to step 48 to verify user authorization.

If the user is authorized for the requested type of call, control branches at step 49 to step 50 where a timer is started. The timer keeps track of the call duration for accounting purposes. If the user is not authorized in step 49, then control branches to step 52 and the call is disconnected.

Once the timer is started at step 50, gateway 26 waits for the timer to expire or for the user to hang-up. If the timer expires, control branches at step 51 back to step 46 to determine if the user is authorized to continue the call past the currently authorized time period. The user account information may have been updated since the timer originally started. For example, credit for additional time may have been added to user account.

If the user hangs-up, control branches at step 51 to step 52 where the gateway 26 terminates the connection with the user and releases the connection resources. The gateway then sends an accounting message at step 54 to the authorization server 14 including the usage information for the call. The usage information is forwarded to the backend billing office 18 where the user account information is updated in the user database 20 to reflect the reported usage.

As mentioned above, authorization of the user account in step 49 can take a number of different forms, such as credit based authorization, destination based authorization and class or quality of service (QoS) authorization.

Figure 5A:
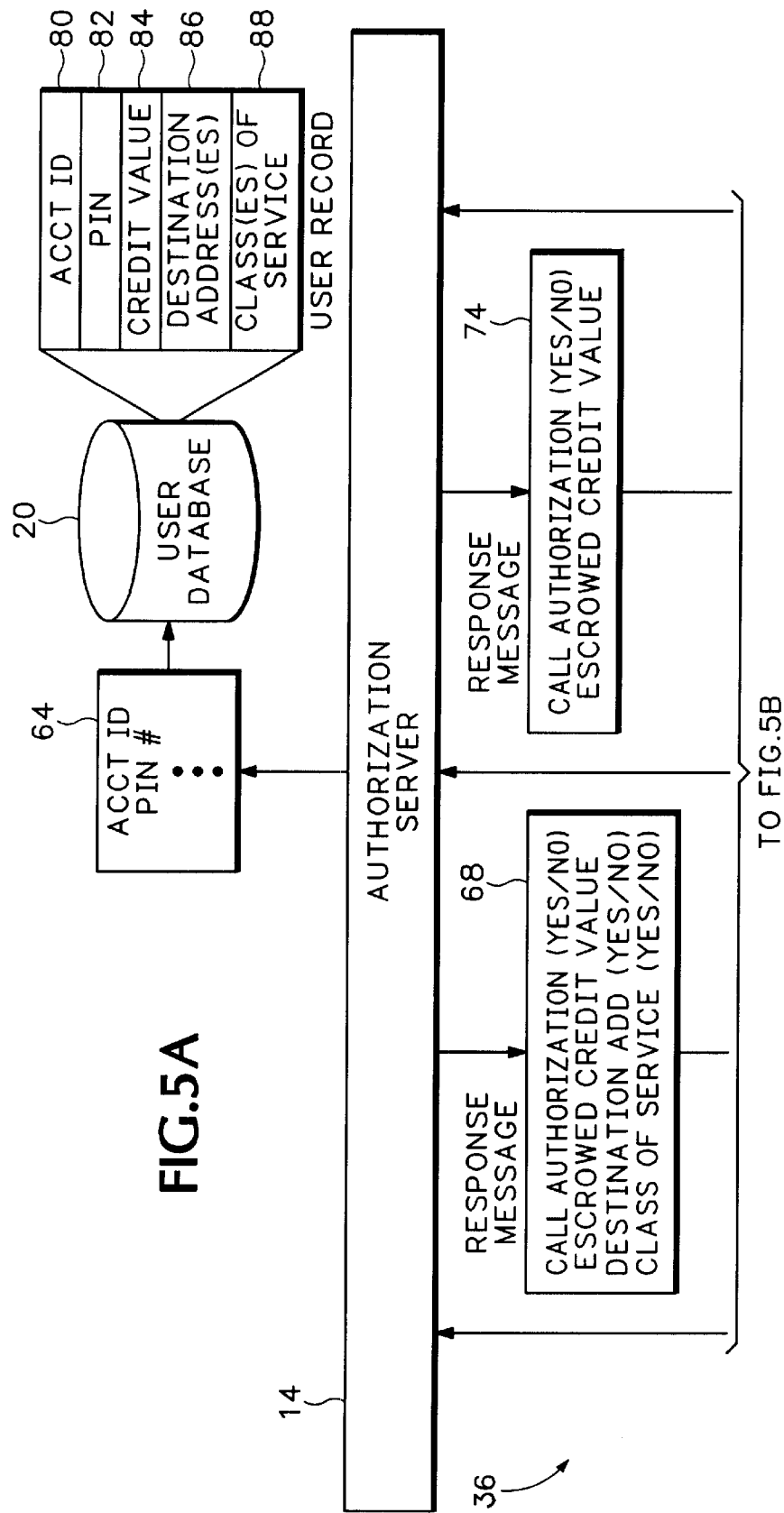
FIG. 5 is a diagram showing the different messages sent between the gateway and an authorization server during the authorization session.
Figure 5B:
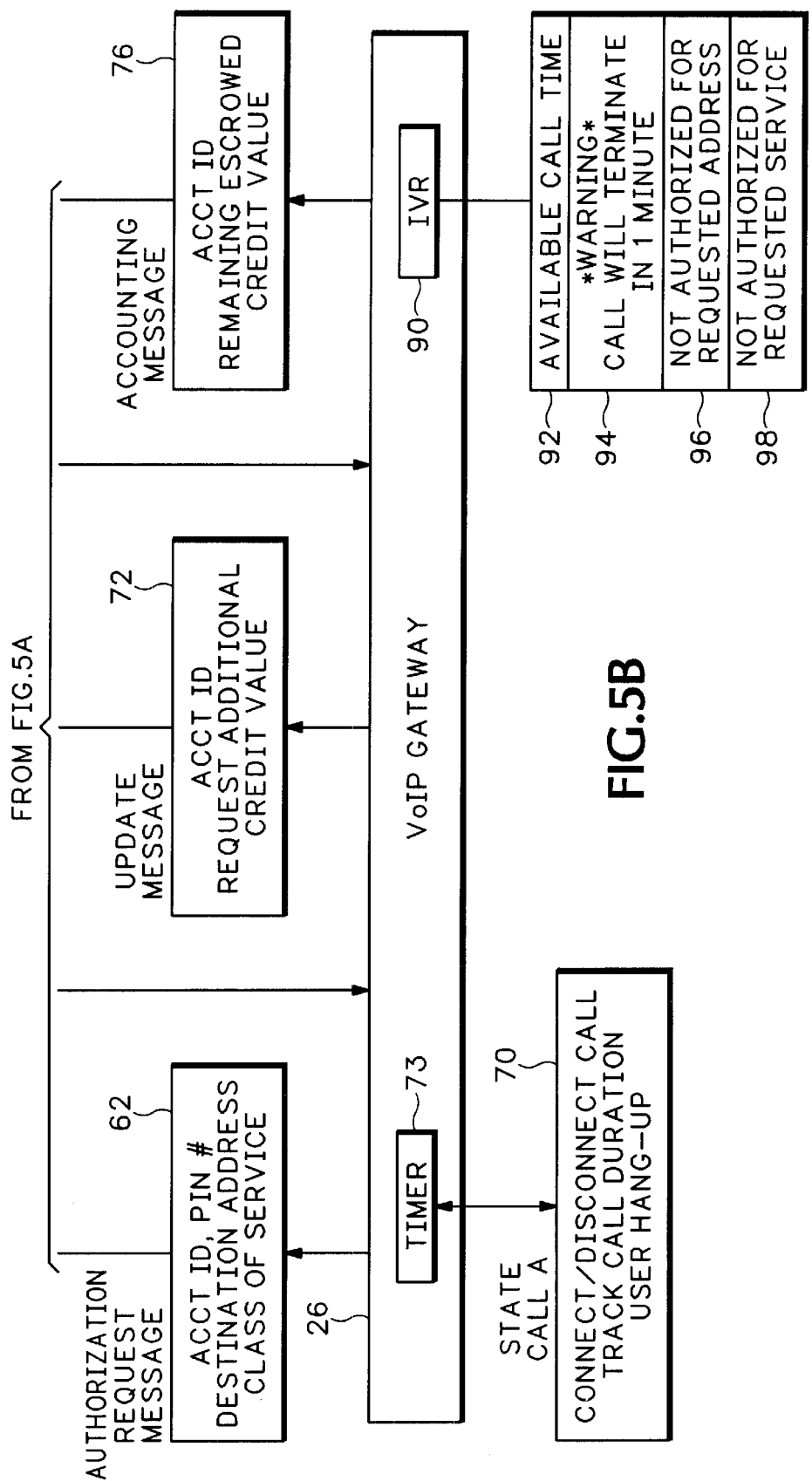

FIG. 5 shows the messages sent between the gateway 26 and the authorization server 14 during the authorization session 36 and the information that may be contained in a user record 78 in database 20.

The authorization server 14 and backend billing office 18 (FIG. 2) comprise an integrated billing system with an authorization front end. The billing system running in backend billing office 18 updates credit values according to user credit and usage. Backend billing systems are known to those skilled in the art and are, therefore, not described in further detail.

In credit based authorization, the authorization server 14 is integrated with software in the backend billing office 18 and is configured to return authorization attributes that the gateway 26 uses to track user credit real time. The backend billing office 18 has real time access to user database 20 which contains user records.

Credit Based Authorization

Credit based authorization is used to process credit based VoIP phone calls. The invention allows the gateway 26 to effectively "escrow" funds from the user account in user database 20 while the call is in progress. The authorization server 14 takes the escrow amount out of the user's debit account in the user database 20. A timer 73 then ticks down the escrow amount during the phone call. If the call terminates before the amount escrowed to the gateway 26 is used up, the remaining escrow amount is "re-credited" to the user's account.

An authorization request message 62 contains the ACCT ID, the PIN and authorization request provided by the user via the IVR application in the gateway 26. The gateway 26 sends the authorization request message 62 to the authorization server 14. The authorization server 14 then uses the user data 64 including the ACCT ID and PIN from the authorization request message 62 to access a debit account in the backend billing office 18 (FIG. 2). If the ACCT ID in the user data 64 matches the ACCT ID 80 for a user record 78 in the database and the PEN matches a PIN 82 in the user record 78, an authorization response message 68 accepting the authorization request is sent back to the gateway 26.

An escrow credit value in response message 68 determines the maximum amount of time a user has for staying connected on a call. The escrowed credit value is carried back to the gateway 26 from the authorization server 14. The gateway 26 uses the credit value to determine how long the call can continue. The user is notified in a message 92 output from the IVR system 90 of the amount of available call time. The gateway 26 then establishes the call.

The gateway 26 initializes the timer 73 to the available call time. The available call time escrowed to the gateway 26 can be configured to be the sum total of all time that is available in the user debit account or a pre-determined credit unit. When the timer 73 expires, the escrowed credit value has run out. The gateway 26 can make another request to escrow funds from the user debit account or can terminate the call. The IVR 90 can be activated to play a warning message 94 to the user and provide a grace period before disconnecting the call. If a request is made to escrow additional funds, the gateway 26 sends an update message 72 to the authorization server 14. The user debit account in the database 20 is accessed again to determine if the user has acquired additional credit. If additional credit is available, more credit is escrowed in a response message 74.

If the user hangs up before the escrowed funds run out, the gateway 26 disconnects the call and sends an accounting message 76 back to the authorization server 14. The accounting message 76 identifies any remaining amount in the escrowed funds. The authorization server 14 sends the usage information in the accounting message 76 back to the billing office 18 (FIG. 2) which in turn updates the user debit account in database 20.

Destination Based Authorization

Destination based Authorization is used to authorize calls based on a specified destination address. For destination based authorization, the user record 78 in user database 20 includes one or more destination addresses 86 that a user is authorized to connect to.

The destination address requested by the user is passed from the gateway 26 to the authorization server 14 along with the user's ACCT ID and PIN in the authorization request message 62. The authorization server 14 uses the ACCT ID, PIN and destination address in the user data 64 to query the user database 20. If a user record 78 in database 20 matches the ACCT ID and PIN and contains the requested destination address, the authorization server 14 accepts the destination request. The response message 68 sent back to the gateway 26 indicates the destination address request has been accepted. The destination address 86 can be implemented as an array, a linked list, a TRIE, or other data structure of multiple address attributes to allow authorization for multiple destinations.

Based on the response message, the gateway 26 connects or terminates the call connection requested by the user. In a similar way to credit based authorization, the IVR application 90 in the gateway 26 can prompt the user for user account and connection information, as well as play out a message reporting the result of the destination address request. For example, if the user is not authorized to connect to the requested destination, the IVR 90 can play a message 96 notifying the user that a call to the requested address is not authorized.

In one example of destination based authorization, employees (i.e. users) of a company are only permitted to make calls to the number (i.e. the destination address) of company headquarters and the usage charges are billed directly to the company. User records are inserted into the user database 20 for each employee that include the employee ACCT ID and PIN. The user records in database 20 indicate the employee is permitted access only to the destination address of the company headquarters.

The destination address requested by the employee is sent from the gateway 26 to authorization server 14 in authorization request message 62. The authorization server 14 queries database 20 and finds an entry for the employee. A successful database query is reported back by the authorization server 14 to gateway 26 which, in turn, establishes the call connection. After the call disconnects, the usage information is reported from the gateway 26 to the authorization server 14 in accounting message 76 and the company account is billed.

Quality of Service Authorization

The authorization session can also be used to authorize calls based on a requested class of service or quality of service (QoS). For class based authorization, the user record 78 in user database 20 includes class(es) of service 88 that the user is permitted to use.

During authorization, the class of service requested by the user is passed from the gateway 26 to the authorization server 14 along with the user's ACCT ID and PIN in the authorization request message 62. The authorization server 14 queries user database 20 with the ACCT ID, PIN and class of service in user data 64. If a user record 78 is found in database 20 indicating that the user is authorized to connect with the requested class or service, the authorization server 14 sends back the response message 68 accepting the requested class of service.

If the user record 78 indicates that the user is not authorized for the requested class of service, the response message 68 rejects the class of service request. The class of service attribute 88 can be implemented as an array or a linked list of multiple class attributes to allow authorization of the user for multiple class values.

Based upon the acceptance or denial of the call request, the gateway 26 establishes the call for the requested class of service or terminates the call request. In a similar way to credit and destination based authorization, the IVR application in the gateway 26 prompts the user for user account and connection information, as well as plays out a message 98 notifying the user of the status for the requested class of service.

As an example of class based authorization, a user subscribes to video conferencing services. The subscriber pays a fee and is then permitted to make VoIP video conference calls. A user record is inserted into the user database 20 for the subscriber having the subscriber's ACCT ID and PIN and a class of service identifier 88 corresponding to video conferencing.

The class of service requested by the user is sent from the gateway 26 to authorization server 14 along with the ACCT ID and PIN in the authorization request message 62. The authorization server 14 finds the user record 78 in the database 20 matching the ACCT ID, PIN and requested class of service. The successful database query is reported to gateway 26 in response message 68 which enables the gateway 26 to make the video connection. After the call disconnects, the usage information associated with the video conference is reported in accounting message 76 back to the authorization server 14 for billing to the subscriber.

Other examples of classes of services are grades of voice (i.e. compression algorithm used), multi-party conferencing, call forwarding, and callerID. These services are typically based upon the use of specific infrastructure required to support the class of service.

Having described and illustrated the principles of the invention in a preferred embodiment thereof, it should be apparent that the invention can be modified in arrangement and detail without departing from such principles. For example, though the present invention is described in the context of credit, QoS and destination based authorization, it will be understood by those of ordinary skill in the art that the principles of the present invention can be applied to other authorization based calls. We claim all modifications and variations coming within the spirit and scope of the following claims.

What is claimed is:

1. A call authorization system for use in a packet switched network, comprising:
   a gateway receiving an authorization request for establishing a phone call through the packet switched network;
   the gateway sending an authorization request message forwarding the authorization request and receiving back a response message either accepting the call and authorization request message or rejecting the call and authorization request, the response message accepting the call and authorization request including a credit value;
   the gateway connecting the phone call and maintaining authorization states for the connected phone call when the response message indicates the authorization request is accepted;
   the gateway sending another authorization request message during the connected phone call requesting additional time when the credit value is about to be used up by the connected phone call; and
   maintaining the connected phone call when the response to the additional authorization request message provides an additional credit value.

2. A call authorization system according to claim 1 wherein the gateway receives an account identifier from a user and transmits the account identifier in the authorization request message to an authorization server, the authorization server using the account identifier as an index for matching a user record in a database.

3. A call authorization system according to claim 2 wherein the account identifier comprises an account number and/or a personal identification number.

4. A call authorization system according to claim 2 wherein the response message indicates acceptance of the authorization request when a user record in the database matches the account identifier and contains the authorization request in the authorization request message.

5. A call authorization system according to claim 1 wherein the response message includes a credit value from a user record matching the account identifier.

6. A call authorization system according to claim 5 wherein the gateway uses the credit value to initialize a timer for tracking duration of the connected phone call.

7. A call authorization system according to claim 5 where the gateway reports the credit value and the duration of the call back to the user over an IVR system.

8. A call authorization system according to claim 5 wherein the gateway transmits an accounting message to an authorization system after the call is terminated, the accounting message indicating a duration of the phone call.

9. A call authorization system according to claim 8 wherein the authorization system updates the credit value in the matching user record according to the call duration.

10. A call authorization system according to claim 5 wherein the gateway periodically transmits authorization request messages to the authorization server requesting updates to the credit value.

11. A call authorization system according to claim 1 wherein the authorization request message includes a destination address, the gateway connecting the call when the destination address is indicated as accepted by the response message.

12. A call authorization system according to claim 2 wherein a Radius protocol is used in the gateway and the authorization server for processing the authorization request.

13. A call authorization system according to claim 1 wherein the authorization states maintained by the gateway include tracking an account identifier for the call, a duration of the call, a connect status of the call, and accounting information for the phone call.

14. A method for authorizing a user to access a phone network through a gateway, comprising:

receiving a call connection request from a user;

collecting an account identifier from the user;

sending the account identifier and the call connection request from the gateway for authorization;

connecting the call and maintaining authorization states with the gateway when a response message authorizing the call connection request is received by the gateway;

receiving a credit value with the response message authorizing the call connection request;

sending another request from the gateway to extend the connected call when a call authorization period for the connected call is about to run out; and extending the connected phone call when another response message is received by the gateway authorizing an additional call authorization period.

15. A method according to claim 14 wherein the gateway connects the call for a time period corresponding to escrowed funds from a user debit account contained in the response message.

16. A method according to claim 15 wherein the gateway periodically sends update messages requesting more escrowed funds from the debit account.

17. A method according to claim 15 including notifying the user from time to time with the gateway as to what portion of the time period remains in the call.

18. The method according to claim 15 including disconnecting the call when the user hangs up and sending an accounting message from the gateway identifying any remain portion of the escrowed funds to be recredited to the debit account.

19. The method according to claim 14 including:

sending a destination address in the call connection request;

receiving the response message accepting the call request when a matching user record verifies the destination address;

receiving the response message rejecting the call connection request when there is no matching user record or the matching user record does not verify the destination address;

connecting the call through the gateway when the response message accepts the call connection request; and terminating the call when the authorization message rejects the call connection request.

20. An authorization server for authorization based call requests made in a packet switched network having a gateway, comprising:

the authorization server receiving an authorization request message from the gateway including a call account identification and an authorization request;

the authorization server using the call account identification as an index for matching a user record in a user database;

the authorization server accepting the authorization request when a matching user record verifies the authorization request;

the authorization server rejecting the authorization request when there is no matching user record or a matching user record does not verify the authorization request;

the authorization server sending a response message back to the gateway enabling the gateway to connect and maintain authorization based states for the call when the authorization request is accepted and causing the gateway to terminate the call when the authorization request is accepted;

the authorization server authorizing the call for a period of time with the response message accepting the authorization request;

the authorization server receiving another authorization request from the gateway requesting authorization of the connected call for an additional period of time; and the authorization server sending out another response message authorizing the additional time period for maintaining the connected phone call when an account associated with the matching user record indicates available credit.

21. An authorization server according to claim 20 wherein the response message contains a credit value obtained from the matching user record.

22. An authorization server according to claim 20 wherein the authorization server verifies a destination address in the authorization request with the matching user record.

23. A method for authorizing a user to access a phone netweork, comprising:

receiving an authorization request message including an account identifier and a call connection request;

querying a user database for a user record matching the account identifier;

authorizing a call when contents in a matching user record correspond with the call connection request;

rejecting authorization of the call when there is no matching user record in the user database or a matching user record does not correspond with the call connection request;

sending an authorization message that enables a gateway to connect the call when the call connection request is authorized and further enables the gateway to maintain authorization states for the call;

sending an authorization message that causes the gateway to terminate the call when the call connection request is rejected;

sending a call credit value with the authorization message authorizing the connection request;

receiving another authorization request from the gateway while the call is connected requesting an additional credit value for the connected call;

authorizing an additional period of time for maintaining the call when there is an available credit value in a matching user record; and sending an authorization message that enables the gateway to maintain the connected call for a period of time associated with the available credit value.

24. A method according to claim 23 including sending a credit value from the matching user record in the authorization message.

25. A method according to claim 23 including verifying a destination address in the call connection request corresponds with the matching user record.

* * * * *

UNITED STATES PATENT AND TRADEMARK OFFICE
CERTIFICATE OF CORRECTION

PATENT NO. : 6,404,870 B1 Page 1 of 1
DATED : June 11, 2002
INVENTOR(S) : Azita E. Kia, Cary FitzGerald and David R. Oran It is certified that error appears in the above-identified patent and that said Letters Patent is hereby corrected as shown below:

Column 4,
Line 42, "verify." should read -- verify --.

Column 6,
Line 17, "PEN" should read -- PIN --.

Column 8,
Line 18, "caller 1D" should read -- caller ID --.

Column 10,
Line 39, "request is accepted" should read -- request is rejected --.
Line 59, "netweork" should read -- network --.

Signed and Sealed this

Tenth Day of December, 2002

JAMES E. ROGAN
*Director of the United States Patent and Trademark Office*